United States Patent [19]

McCrobie

[11] 4,056,308

[45] Nov. 1, 1977

[54] VARIABLE FOCAL LENGTH REFLECTOR LENS SYSTEM

[75] Inventor: George Louis McCrobie, Upland, Calif.

[73] Assignee: Xerox Corporation, Stamford, Conn.

[21] Appl. No.: 663,394

[22] Filed: Mar. 3, 1976

[51] Int. Cl.² .................. G02B 15/14; G02B 17/00
[52] U.S. Cl. ............................... 350/184; 350/202; 350/203; 350/226
[58] Field of Search ............. 350/184, 202, 203, 226, 350/215, 186

[56] References Cited

U.S. PATENT DOCUMENTS

| | | | |
|---|---|---|---|
| 2,663,223 | 12/1953 | Hopkins | 350/184 |
| 3,402,003 | 9/1968 | McFarland | 350/202 X |
| 3,871,749 | 3/1975 | Harada | 350/215 |

Primary Examiner—Paul A. Sacher
Attorney, Agent, or Firm—Robert J. Bird

[57] ABSTRACT

A variable magnification lens in the form of a reflector lens as the equivalent of a symmetrical fulls lens without reflector. The invention is exemplified by a three-element zoom lens having a fixed outer element and a fixed reflector at the lens "center". The two inner elements form an integral pair and move with respect to the outer element to effect magnification change while maintaining a substantially flat image field over the entire magnification range.

3 Claims, 2 Drawing Figures

VARIABLE FOCAL LENGTH REFLECTOR LENS SYSTEM

BACKGROUND OF THE INVENTION

This invention relates to variable magnification or zoom lenses, and more particularly to a zoom "half lens" or reflector lens capable of operation as the equivalent of a full lens having twice as many elements in symmetrical form. In copending application Ser. No. 663,397 filed concurrently herewith in the names of Price and Spurles, a variable magnification lens is disclosed which includes a symmetrical arrangement of outer crown elements, inner flint elements, and innermost meniscus elements. The crown elements are stationary with each flint-meniscus pair movable as a unit to vary the magnification. The movements of the flint-meniscus pairs are symmetrical as are the lens elements themselves. The perfect symmetry of the lens described in that copending application renders the lens usable in a reflector lens mode, that is with a reflector at the lens center by which to fold the optical axis back through the "front" half of the lens as an economical substitute for the back half of the lens. A reflector lens of unity magnification is disclosed, by way of background, in U.S. Pat. No. 3,659,922 issued to George L. McCrobie.

It is an object of this invention to provide a variable magnification reflector lens.

Other objects, advantages, and features of this invention will become apparent from the following more detailed description of an exemplary embodiment given in connection with the accompanying drawing.

DRAWING

DESCRIPTION

Figure 1:
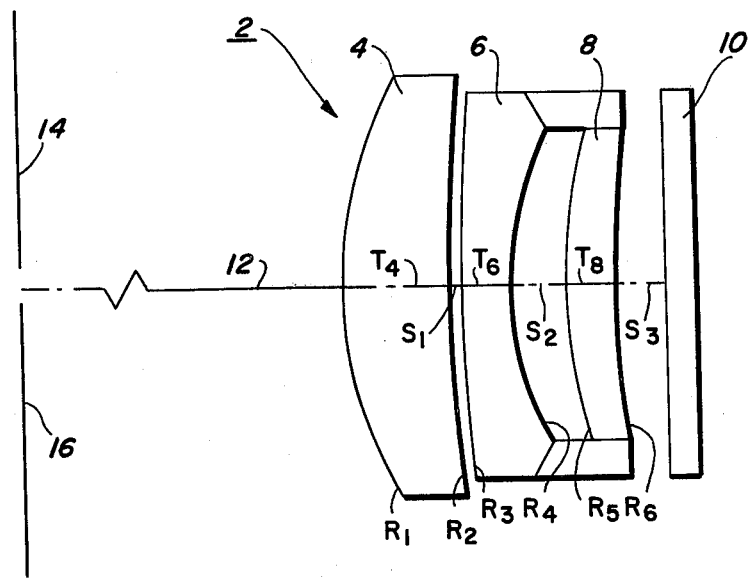
FIG. 1 is an optical diagram of a variable magnification reflector lens according to the present invention and represented at its longest focal length.
Figure 2:
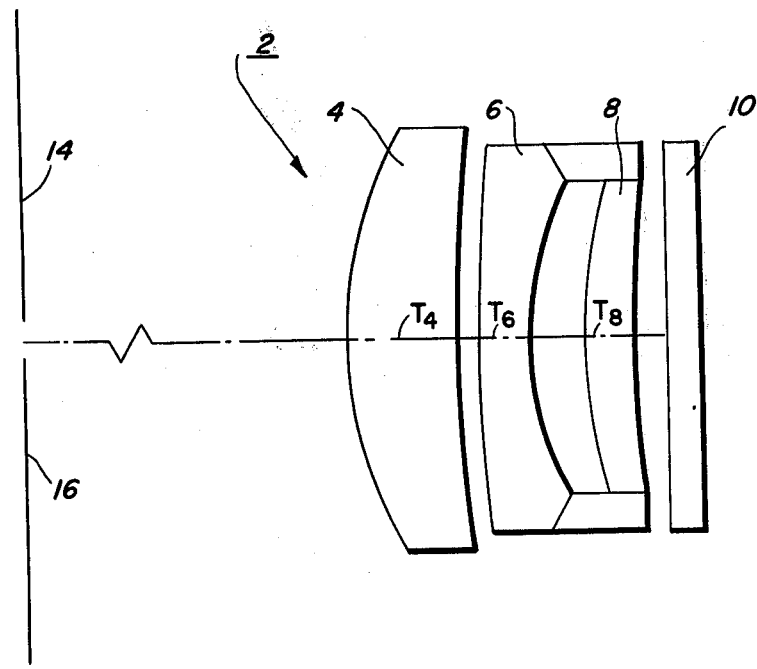
FIG. 2 is similar to FIG. 1 showing the same lens at its shortest focal length.

Referring now to the drawing, a variable magnification or zoom lens is generally indicated at 2. It includes lens elements 4, 6, 8 and a first surface reflector 10 in optical alignment along optical axis 12. Lens 2 is shown disposed relative to conjugate object and image planes 14 and 16 respectively.

Front lens element 4 is a positive crown element. Element 6 is a negative flint element. Element 8 is a meniscus element. The entire lens 2 and one or both of the conjugate planes 14 and 16 are disposed for relative movement to change magnfication. Within the lens 2, however, only elements 6 and 8 are movable. Elements 6 and 8 are preferably fixed to one another as a unit for movement together though this is not essential. A suitable mechanism is provided for effecting the desired movement of the lens 2 and elements 6 and 8, but is not a part of this invention and is not shown herein.

By itself, the movement of flint element 6 relative to the outer crown element 4 introduces field curvature at the image plane. However, the movement of the meniscus element in the same direction as the flint element also introduces field curvature, but in the opposite sense. Thus, it has been found that by moving the meniscus element 8 with the flint element 6 as a unit relative to the outer crown element 4, the field curvatures otherwise introduced are substantially balanced out with a net result of a substantially flat image field throughout the magnification range. This property of the lens is disclosed here by way of background, and is in fact a part of the invention disclosed by Price and Spurles in the aforementioned copending application Ser. No. 663,397, the specification of which is incorporated herein by reference.

A specific zoom lens in accordance with this invention is defined by the parameters listed in the following table in which $N_d$ is the refractive index for the d line of sodium and $V_d$ is the dispersion value or Abbe Number. Radii (R), thicknesses (T), and spacings (S) are expressed in inches.

| Lens | Radius (R) | Thickness (T) | Spacing (S) | $N_d$ | $V_d$ |
|---|---|---|---|---|---|
| 4 | $R_1$ 2.50358 | $T_4$ .72176 | | 1.58913 | 61.27 |
| | $R_2$ 31.64727 | | (1.007X) .05202<br>$S_1$ (0.800X) .06872<br>(0.615X) .13403 | | |
| 6 | $R_3$ 37.17555 | $T_6$ .29455 | | 1.59197 | 48.51 |
| | $R_4$ 1.99482 | | $S_2$ .37619 | | |
| 8 | $R_5$ 3.58139 | $T_8$ .30862 | | 1.60311 | 60.60 |
| | $R_6$ 6.15101 | | (1.007X) .41801<br>$S_3$ (0.800X) .40131<br>(0.615X) .33599 | | |

The foregoing description of a specific embodiment of this invention is given by way of illustration and not of limitation. The invention is more broadly conceived and embraces the general combination of lens elements including an outer crown element, an inner flint element and an innermost meniscus element, all in combination with a reflector, the crown element being stationary with respect to the reflector and the flint/meniscus combination movable relative to the crown for varifocal operation, all of this being in a reflector lens configuration.

What is claimed is:

1. A variable magnification reflector lens including the following elements in alignment along an optical axis:
   a positive crown element,
   a negative flint element spaced from said crown element,
   a meniscus element spaced from said flint element,
   a reflector spaced from said meniscus element,
   said corwn element and said reflector being fixed relative to each other,
   said flint and meniscus elements being movable in the same direction along said optical axis relative to said crown element and said reflector to vary the focal length of said lens.

2. A variable magnification lens as defined in claim 1 in which:
   said flint element and said meniscus element are integrally connected as a unit for movement together along said axis.

3. A variable magnification reflector lens including the following elements in alignment along an optical axis:
   a positive crown element,
   a negative flint element spaced from said crown element,
   a meniscus element spaced from said flint element,
   a reflector spaced from said meniscus element, said crown element and said reflector being fixed relative to each other, said flint and meniscus elements being movable along said optical axis to vary the focal length of said lens, the parameters of lens radii (R) thicknesses (T) spacings (S), refractive indices ($N_d$) and dispersion values ($V_d$) being in accordance with the following table wherein radii, thicknesses and spacings are expressed in inches.

* * * * *